US012681433B2

(12) United States Patent
Zhang

(10) Patent No.: US 12,681,433 B2
(45) Date of Patent: Jul. 14, 2026

(54) OPTICAL IMAGING STRUCTURE

(71) Applicant: Beijing Listening Vision Culture Technology Co., Ltd., Beijing (CN)

(72) Inventor: Zhe Zhang, Beijing (CN)

(73) Assignee: Beijing Listening Vision Culture Technology Co., Ltd., Beijing (CN)

( * ) Notice: Subject to any disclaimer, the term of this patent is extended or adjusted under 35 U.S.C. 154(b) by 306 days.

(21) Appl. No.: 18/499,875

(22) Filed: Nov. 1, 2023

(65) Prior Publication Data

US 2024/0152095 A1     May 9, 2024

(30) Foreign Application Priority Data

Nov. 3, 2022    (CN) ........................ 202211366874.X

(51) Int. Cl.
*G03H 1/22*          (2006.01)

(52) U.S. Cl.
CPC .................................... *G03H 1/22* (2013.01)

(58) Field of Classification Search
CPC ... G03H 1/22; G02B 5/08; G02B 7/00; G02B 17/004; G02B 27/01
See application file for complete search history.

(56) References Cited

U.S. PATENT DOCUMENTS

| | | | | |
|---|---|---|---|---|
| 2007/0201004 A1* | 8/2007 | O'Connell | ............. | G03B 21/28 |
| | | | | 359/449 |
| 2012/0313839 A1* | 12/2012 | Smithwick | ............. | G02B 30/30 |
| | | | | 345/6 |
| 2016/0129365 A1* | 5/2016 | Crowder | ................ | G02B 30/56 |
| | | | | 472/61 |

FOREIGN PATENT DOCUMENTS

| | | | | | |
|---|---|---|---|---|---|
| CN | 206311897 U | * | 7/2017 | | |
| CN | 107678267 A | | 2/2018 | | |
| CN | 113467213 A | | 10/2021 | | |
| CN | 113467214 A | | 10/2021 | | |
| CN | 114563937 A | | 5/2022 | | |
| JP | 2003177464 A | * | 6/2003 | | |
| KR | 20100112823 A | | 10/2010 | | |
| KR | 20170111760 A | * | 10/2017 | .............. | G03H 1/22 |
| WO | WO-2020185963 A1 | * | 9/2020 | ........ | H04M 1/72409 |
| WO | 2022028448 A1 | | 2/2022 | | |

* cited by examiner

*Primary Examiner* — William R Alexander
*Assistant Examiner* — Mackenzi Bourquine

(57)          ABSTRACT

An optical imaging structure includes a reflection structure, a holographic medium, a first display screen and a second display screen. A first angle is arranged between the reflection structure and the first display screen; the second display screen is located directly above the reflection structure, the second display screen is parallel to the reflection structure, and a distance between the second display screen and the reflection structure is greater than the width of the first display screen. The holographic medium is arranged at an inner side of a structure formed by the reflection structure, the first display screen and the second display screen, and a second angle is arranged between the holographic medium and the first display screen. The first angle is 90°, the second angle is 45°.

8 Claims, 7 Drawing Sheets

OPTICAL IMAGING STRUCTURE

CROSS REFERENCE TO RELATED APPLICATIONS

This application claims foreign priority of Chinese Patent Application No. 202211366874.X, filed on Nov. 3, 2022 in the China National Intellectual Property Administration, the disclosures of all of which are hereby incorporated by reference.

TECHNICAL FIELD

The present invention relates to the technical field of optical structures, in particular to an optical imaging structure.

BACKGROUND OF THE PRESENT INVENTION

Holographic phantom imaging makes people feel like air imaging through light refraction and misjudgment of human eyes. This technology is a revolutionary imaging concept in the future, as well as stereoscopic imaging without glasses. The holographic phantom imaging technology is a popular high technology in recent years, and a promotion means that displays products by using a holographic film combined with a display screen and image content. This new interactive display technology combines decoration with practicability. Without images, it is completely transparent, which provides a new interactive feeling for users. This technology has become a most fashionable means of product display and market promotion currently. Holographic phantom imaging is widely used in various commodity release conference, real estate exhibitions, automobile and jewelry fairs, fashion shows, vocal concerts, etc.

As shown in FIG. 9, the existing holographic imaging system comprises a reflection structure 1 perpendicular to the ground, a holographic medium 2, a first display screen 3, an eye tracking camera device 4 and a holographic image processing platform. An angle between the reflection structure 1 and the first display screen 3 is 90°. The holographic medium 2 is between the reflection structure 1 and the first display screen 3. The angle between the holographic medium 2 and the reflection structure 1 and the angle between the holographic medium 2 and the first display screen 3 are both 45°. The heights of the reflection structure 1 and the first display panel 3 are the same, and the widths of the reflection structure 1 and the first display screen 3 are the same. The heights of the holographic medium 2 and the reflection structure 1 are the same, and the width of the holographic medium 2 is V times the width of the reflection structure 1. The eye tracking camera device 4 is installed above a front frame of a structure corresponding to the angle between the reflection structure 1 and the holographic medium 2. The eye tracking camera device 4 is used for collecting the eye images and a head image of a viewer. The eye tracking camera device 4 provides the collected images to the holographic image processing platform. The holographic image processing platform calculates the line of sight direction and the head position of the viewer in viewing through an eye tracking algorithm and a head tracking algorithm. The visual angles of the displayed holographic images are adjusted synchronously according to the above information, so that the angles of the image display are always consistent with the viewing angle of the viewer.

As shown in FIG. 10, the reflection structure 1 is composed of a cuboid frame 11, a mirror 12 and optical glass 13. Light-emitting elements 14 are installed in a circle at the inner sides of four planes of the cuboid frame 11. The light-emitting elements 14 can be LED lamp bands, LED screens or other elements or materials that can emit light. The light emitted by the light-emitting elements 14 is reflected by each other through the optical glass 13 and the mirror 12 to form a visual effect of infinite inward extension. In this way, a very deep spatial visual effect is achieved through a very shallow physical depth.

The holographic medium 2 is a thin film with a special chemical coating, or the holographic medium 2 is a glass coated with a special chemical coating. It has strong reflectivity for image reflection, and also has high transparency.

In use, the light reflected from the infinitely extended space and formed by the reflection structure 1 is incident on the holographic medium 2, and the virtual image of the infinite space reflected from the holographic medium 2 is imaged behind the first display screen 3. A foreground image displayed by the first display screen 3, and the infinite space effect of the virtual image of the reflection structure 1 formed behind the first display screen 3 form an obvious depth feeling, to allow people to ignore the first display screen 3 in front of them, and a naked-eye 3D image display effect is presented in the entire device.

The prior art has the following problems: the system forms the spatial display effect of infinite inward extension for the reflection structure through the holographic medium, but the system has no background image to display.

SUMMARY OF PRESENT INVENTION

The present invention provides an optical imaging structure to solve the technical problem that no background image can be displayed in the background.

To solve the above technical problem, the present invention discloses an optical imaging structure, which comprises: a reflection structure, a holographic medium, a first display screen and a second display screen;

A first angle is arranged between the reflection structure and the first display screen;

The second display screen is located directly above the reflection structure, the second display screen is parallel to the reflection structure, and a distance between the second display screen and the reflection structure is greater than the width of the first display screen;

The holographic medium is arranged at an inner side of a structure formed by the reflection structure, the first display screen and the second display screen, and a second angle is arranged between the holographic medium and the first display screen.

Preferably, the first angle is 90°, the second angle is 45°, and the angle between the holographic medium and the second display screen and the angle between the holographic medium and the reflection structure are both 45°.

Preferably, the length of the holographic medium, the length of the reflection structure, the length of the first display screen and the length of the second display screen are the same; the width of the reflection structure, the width of the first display screen and the width of the second display screen are the same; and the width of the holographic medium is $\sqrt{2}$ times the width of the reflection structure.

Preferably, the reflection structure comprises a cuboid frame, a mirror and optical glass; light-emitting elements are installed in a circle at the peripheral inner side of the cuboid frame; the mirror is arranged at the lower part of the cuboid frame; and the optical glass is arranged at the upper part of the cuboid frame.

Preferably, the optical glass has the optical property of unidirectional light transmission.

Preferably, the mirror is parallel to the corresponding side edge of the cuboid frame; and the optical imaging structure further comprises:

an inner rectangular frame, wherein the peripheral outer side of the inner rectangular frame is fixed at the lower part of the peripheral inner side of the cuboid frame;

four groups of auxiliary mechanisms, wherein the four groups of auxiliary mechanisms are arranged at the lower part of the peripheral sides of the cuboid frame respectively, and the auxiliary mechanisms further comprise:

two groups of first auxiliary connecting rods perpendicular to the corresponding side edge of the cuboid frame, wherein the first auxiliary connecting rods slidably penetrate through the corresponding side edge of the cuboid frame;

first connecting plates, wherein the first connecting plates are parallel to the corresponding side edge of the cuboid frame, and the first connecting plates are fixedly connected with one end of the first auxiliary connecting rods located at the inner side of the cuboid frame;

second connecting plates, wherein the second connecting plates are fixedly connected with one end of the first auxiliary connecting rods located at the outer side of the cuboid frame, the outer sides of the first auxiliary connecting rods are sleeved with a first spring, and both ends of the first spring are respectively fixedly connected with the second connecting plates and the outer side of corresponding side edge of the cuboid frame;

second auxiliary connecting rods, wherein one end of the second auxiliary connecting rods is fixedly connected to one side of the second connecting plates away from the first connecting plates;

limiting balls, wherein the limiting balls are connected to the other ends of the second auxiliary connecting rods;

first connecting blocks, wherein the first connecting blocks are fixedly connected to the outer side of the corresponding side edge of the cuboid frame;

telescopic rods, wherein the telescopic rods are parallel to the corresponding side edge of the cuboid frame, and the fixed ends of the telescopic rods are fixedly connected with the first connecting blocks;

second connecting blocks, wherein the second connecting blocks are fixedly connected to the telescopic ends of the telescopic rods, one side of the second connecting blocks close to the corresponding side edge of the cuboid frame is provided with a connecting bevel, and the connecting bevel is in contact with the limiting balls.

Preferably, the auxiliary mechanisms further comprise:

third auxiliary connecting rods, wherein one end of the third auxiliary connecting rods is fixedly connected with one side of the second connecting plates close to the corresponding first connecting plates;

ventilation filter plates, wherein the ventilation filter plates are fixedly connected with the other ends of the third auxiliary connecting rods, and the corresponding side edge of the cuboid frame is provided with a communicating hole through which the ventilation filter plates slide.

Preferably, the middle part of the ventilation filter plate is also provided with a micro cooling fan.

Preferably, the upper part of the left side of the cuboid frame and the upper part of the right side of the cuboid frame are provided with opposite horizontal through hole structures; the left part of the optical glass is connected in the horizontal through hole structure at the left side of the cuboid frame; the right part of the optical glass is connected in the horizontal through hole structure at the right side of the cuboid frame; a part of the horizontal through hole structure close to the inner side of the cuboid frame is a first horizontal through hole; a part of the horizontal through hole structure close to the outer side of the cuboid frame is a second horizontal through hole; the first horizontal through hole is communicated with the second horizontal through hole; and the height of the first horizontal through hole is less than the height of the second horizontal through hole;

The optical glass comprises: a glass body, wherein the left side and the right side of the glass body are fixedly provided with first fixed blocks respectively;

two groups of upper and lower symmetric limiting structures are arranged in each horizontal through hole structure, and the limiting structures comprise:

second fixed blocks, wherein the second fixed blocks are fixedly connected to the inner wall of the second horizontal through hole, and one side of the second fixed blocks close to the optical glass is provided with an elastic block;

slide blocks, wherein the slide blocks are slidably connected with the inner wall of the second horizontal through hole, and second chutes are arranged on the close sides of the opposite upper and lower slide blocks;

slide rods, wherein the slide rods are fixedly connected to one side of the slide blocks close to the second fixed blocks, and the slide rods are slidably connected into first chutes in the second fixed blocks along the left-right direction;

second springs, wherein both ends of the second springs are fixedly connected with the inner walls of the first chutes and the slide rods respectively;

limiting blocks, wherein the limiting blocks are slidably connected in the second chutes along the up-down direction, the close sides of the opposite upper and lower limiting blocks are provided with arc limiting parts, and the arc limiting parts are inserted into arc limiting grooves at the upper or lower ends of the first fixed blocks;

third springs, wherein both ends of the third springs are fixedly connected with the limiting blocks and the inner walls of the second chutes respectively;

permanent magnets, wherein the permanent magnets are arranged on one side of the limiting blocks away from the arc limiting parts, and the inner walls of the second chutes are provided with electromagnets opposite to the permanent magnets.

The beneficial effects of the present invention are as follows:

1. in use of the present invention, the light emitted by an image displayed in the second display screen can pass through the optical glass to reach the mirror, and a virtual image D' is formed through the reflection of the mirror inside the reflection structure. The virtual image D' is located in the infinitely extended space formed by the reflection structure, and the depth of the virtual image D' in the space is equal to the height of the mirror in the reflection structure from the second display screen. The light reflected from the virtual image space, formed by the reflection structure 1 and the second display screen, with four infinitely extended sides and a background image in the middle is incident onto the holographic medium, and the virtual image D" of the infinite space and the background image reflected from the holographic medium is imaged behind the first display screen. The foreground image displayed by the first display screen forms an obvious depth feeling with the infinite space effect of the reflection structure 1 and the background image effect of the second display screen formed behind the first display screen. The first display screen 3 does not display the part of the image, because it is black and does not emit light. Thus, this part will be ignored by the viewer, and only the rear virtual image will be seen, thereby presenting the naked-eye 3D image display effect in the entire device.

2. The background image is not just an infinitely extended black visual effect, but can present a rich background image. The space depth is less than half that of the same type of technology, but the same visual effect can still be displayed.

3. By adding a new display surface and an optical reflection path in the structure of the prior art, the present invention realizes the display of the background image and achieves a rich display effect.

The technical solution of the present invention is further described in detail below through the drawings and embodiments.

DESCRIPTION OF THE DRAWINGS

The drawings are used to provide further understanding for the present invention and constitute part of the description. The drawings are used to explain the present invention together with the embodiments of the present invention, and do not constitute a limitation to the present invention. In the drawings.

In the figures: 1. reflection structure; 11. cuboid frame; 111. communicating hole; 112. horizontal through hole structure; 1121. first horizontal through hole; 1122. second horizontal through hole; 113. left side of the cuboid frame; 114. right side of the cuboid frame; 12. mirror; 13. optical glass; 131. first fixed block; 132. glass body; 14. light-emitting element; 2. holographic medium; 3. first display screen; 4. eye tracking camera device; 5. second display screen; 6. inner rectangular frame; 7. auxiliary mechanism; 71. first auxiliary connecting rod; 72. first connecting plate; 73. second connecting plate; 74. first spring; 75. second auxiliary connecting rod; 76. limiting ball; 77. first connecting block; 78. telescopic rod; 79. second connecting block; 710. connecting bevel; 711. third auxiliary connecting rod; 712. ventilation filter plate; 713. micro cooling fan; 8. limiting structure; 81. second fixed block; 82. elastic block; 83. slide block; 84. slide rod; 85. first chute; 86. second chute; 87. limiting block; 88. arc limiting part; 89. arc limiting groove; 810. permanent magnet; 811. electromagnet.

DETAILED DESCRIPTION OF PREFERRED EMBODIMENTS

Preferred embodiments of the present invention will be described below in combination with drawings. It should be understood that the preferred embodiments described herein are only used for describing and explaining the present invention, but not used for limiting the present invention.

In addition, the description that involves "first", "second", etc. in the present invention is used only for the descriptive purpose, not for specifically referring to the meaning of order or rank, and not for defining the present invention, but only used to distinguish components or operations described in the same technical terms, and shall not be understood to indicate or imply relative importance or hint the number of indicated technical features. Thus, the features limited by "first" and "second" can explicitly or impliedly comprise at least one feature. In addition, the technical solutions and the technical features in the embodiments can be combined with each other, but only on the basis that the combination can be implemented by those ordinary skilled in the art. Where a combination of technical solutions is contradictory or impossible to be implemented, it shall be deemed that such combination of technical solutions does not exist and is not included within the protection scope of the present invention.

Figure 1:
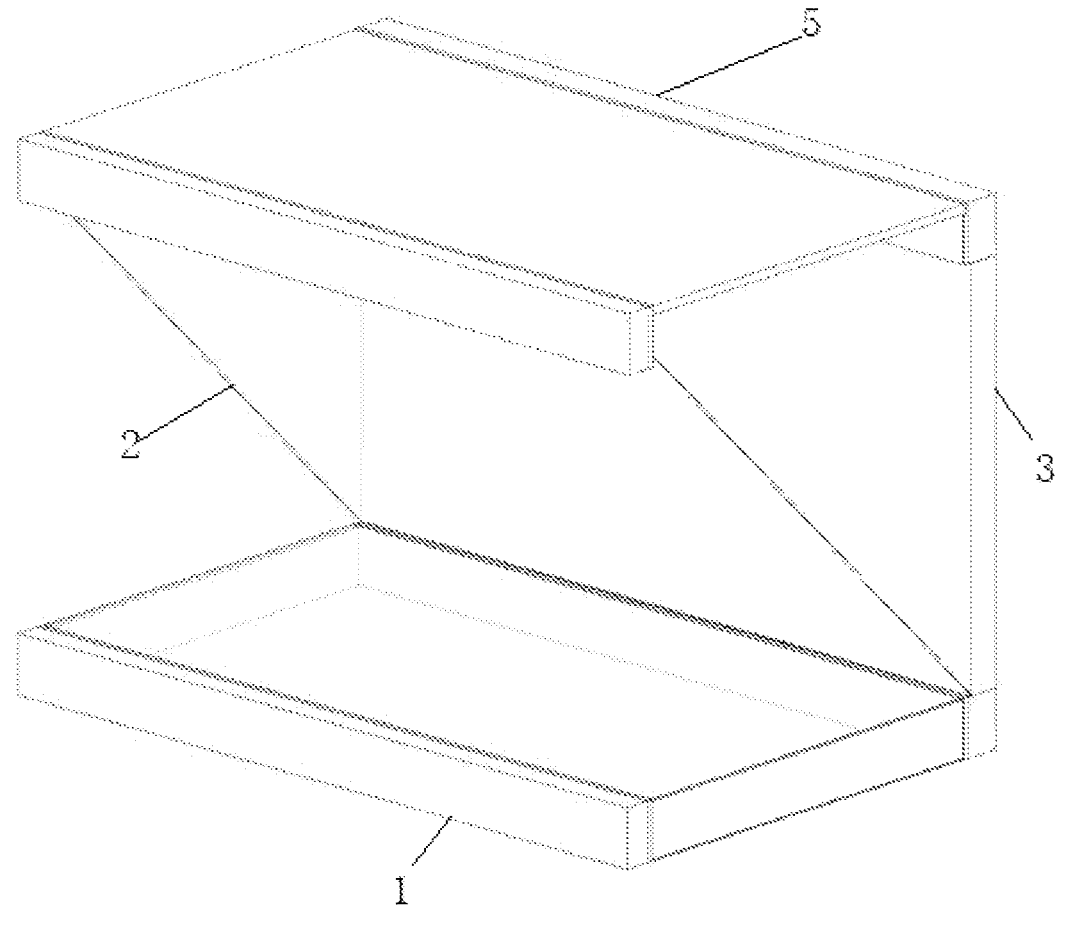
FIG. 1 is a stereoscopic structural schematic diagram of an optical imaging structure of the present invention.
Figure 2:
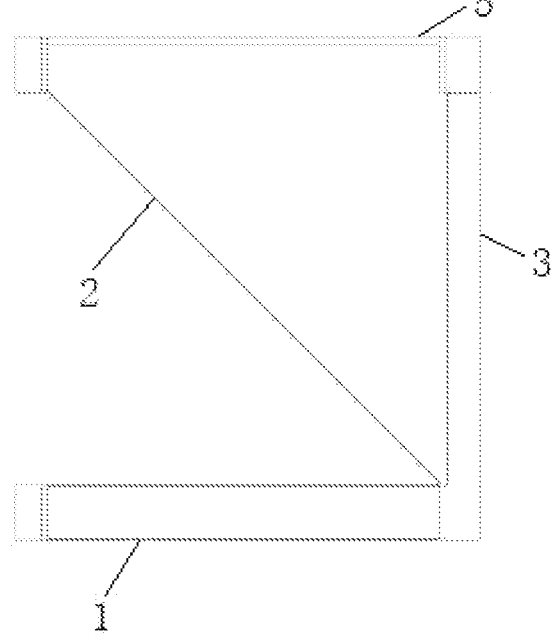
FIG. 2 is a side view of the optical imaging structure of the present invention.
Figure 2:
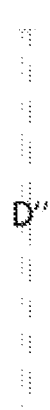
Figure 3:
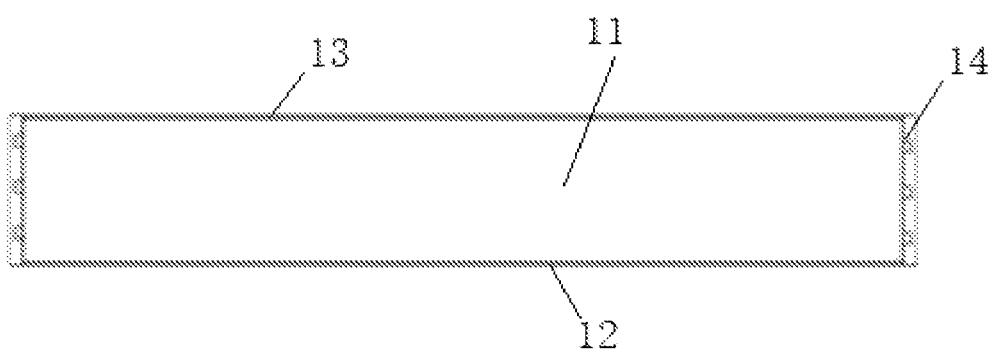
FIG. 3 is a structural schematic diagram of a reflection structure of the present invention.

Embodiment 1: the present embodiment provides an optical imaging structure, as shown in FIGS. 1-3, which comprises: a reflection structure 1, a holographic medium 2, a first display screen 3 and a second display screen 5;

A first angle is arranged between the reflection structure 1 and the first display screen 3;

The second display screen 5 is located directly above the reflection structure 1, the second display screen 5 is parallel to the reflection structure 1, and a distance between the second display screen 5 and the reflection structure 1 is greater than the width of the first display screen 3 (the outer dimension corresponding to the up-down direction of the first display screen 3 in FIG. 1 is the width);

The holographic medium 2 is arranged at an inner side of a structure formed by the reflection structure 1, the first display screen 3 and the second display screen 5, and a second angle is arranged between the holographic medium 2 and the first display screen 3.

Preferably, the first angle is 90°, the second angle is 45°, and the angle between the holographic medium 2 and the second display screen 5 and the angle between the holographic medium 2 and the reflection structure 1 are both 45°.

Preferably, as shown in FIG. 1, the length of the holographic medium 2, the length of the reflection structure 1, the length of the first display screen 3 and the length of the second display screen 5 are the same; the width of the reflection structure 1, the width of the first display screen 3 and the width of the second display screen 5 are the same;

and the width of the holographic medium 2 is Y times the width of the reflection structure 1.

Preferably, the reflection structure 1 comprises a cuboid frame 11, a mirror 12 and optical glass 13; light-emitting elements 14 are installed in a circle at the peripheral inner side of the cuboid frame 11; the mirror 12 is arranged at the lower part of the cuboid frame 11; and the optical glass 13 is arranged at the upper part of the cuboid frame 11.

Preferably, the optical glass 13 has the optical property of unidirectional light transmission. The light-emitting elements 14 can be LED lamp bands, LED screens or other elements or materials that can emit light. The light can pass through the light transmission side of the optical glass 13. The light cannot pass through the reflecting surface of the optical glass 13, but is reflected. The light emitted by the light-emitting elements 14 is reflected by each other through the reflecting side of the optical glass 13 and the mirror 12 to form a visual effect of infinite inward extension. In this way, a very deep spatial visual effect is achieved through a very shallow physical depth.

Preferably, the holographic medium 2 is a thin film with a special chemical coating, or a glass coated with a special chemical coating. It has strong reflectivity for image reflection, and also has high transparency.

The working principle and beneficial effects of the above technical solution are as follows:

1. As shown in FIG. 2, in use, the light emitted by the image displayed in the second display screen 5 can pass through the optical glass 13 to reach the mirror 12, and a virtual image D' is formed through the reflection of the mirror 12 inside the reflection structure 1. The virtual image D' is located in the infinitely extended space formed by the reflection structure 1, and the depth of the virtual image D' in the space is equal to the height (as shown in FIG. 2, the height is the up-down direction) of the mirror 12 in the reflection structure 1 from the second display screen 5. The light reflected from the virtual image space, formed by the reflection structure 1 and the second display screen 5, with four infinitely extended sides and a background image in the middle is incident onto the holographic medium 2, and the virtual image D'' of the infinite space and the background image reflected from the holographic medium 2 is imaged behind the first display screen 3. The foreground image displayed by the first display screen 3 forms an obvious depth feeling with the infinite space effect of the reflection structure 1 and the background image effect of the second display screen 5 formed behind the first display screen 3. The first display screen 3 does not display the part of the image, because it is black and does not emit light. Thus, this part will be ignored by the viewer, and only the rear virtual image will be seen, thereby presenting the naked-eye 3D image display effect in the entire device.

2. The background image is not just an infinitely extended black visual effect, but can present a rich background image. The space depth is less than half that of the same type of technology, but the same visual effect can still be displayed.

3. By adding a new display surface and an optical reflection path in the structure of the prior art, the present invention realizes the display of the background image and achieves a rich display effect.

Figure 4:
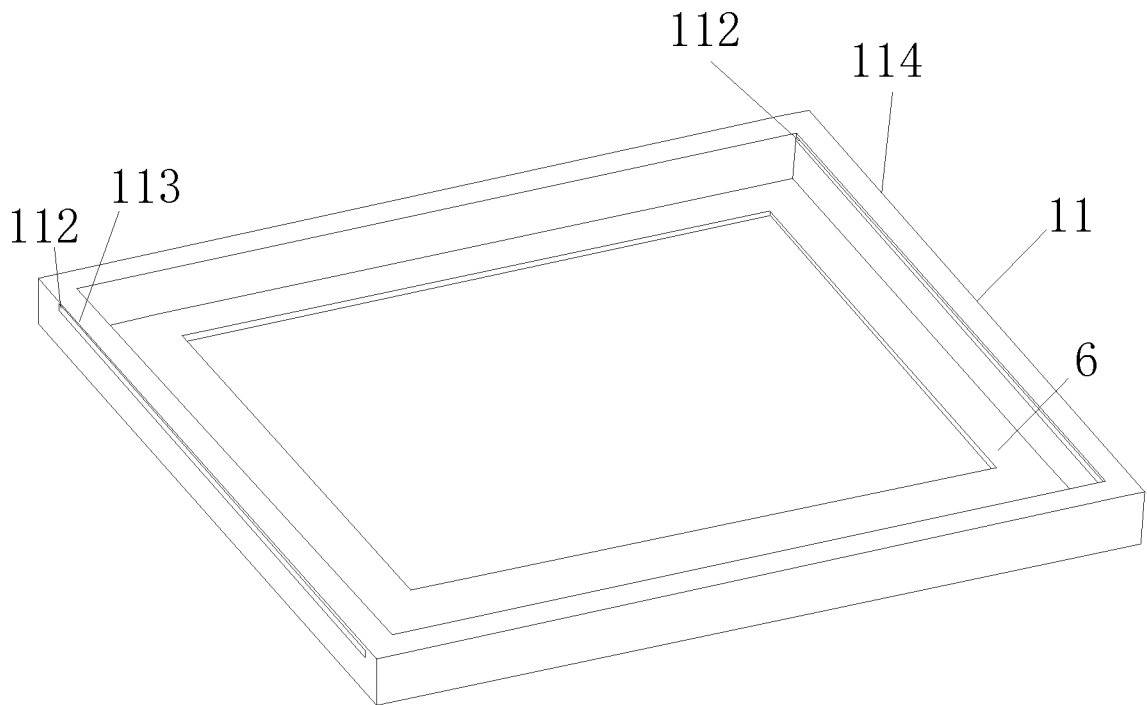
FIG. 4 is a structural schematic diagram of an embodiment of a cuboid frame of the present invention.
Figure 5:
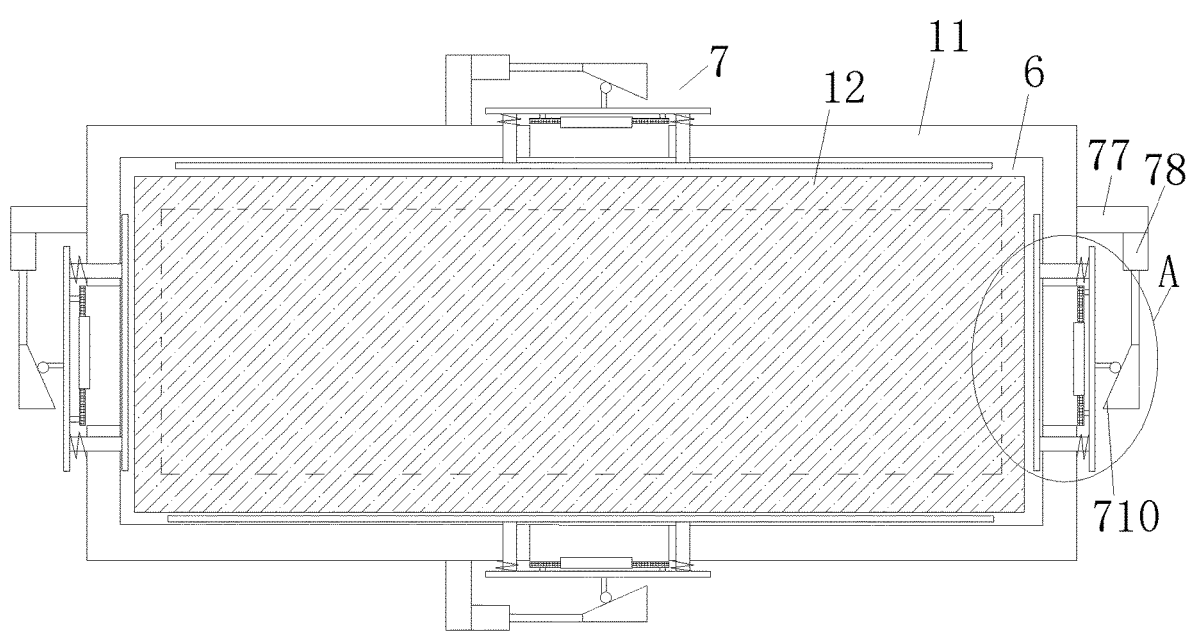
FIG. 5 is a top view of a cuboid frame connected with a mirror and not connected with optical glass in an embodiment of the present invention.
Figure 6:
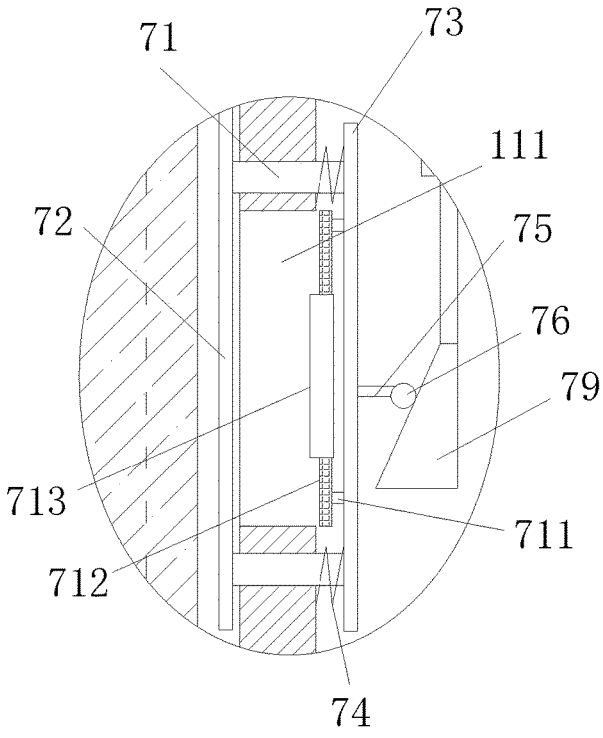
FIG. 6 is a structural enlarged schematic diagram at A in FIG. 5.

Embodiment 2: based on embodiment 1, as shown in FIGS. 4-6, the mirror 12 is parallel to the corresponding side edge of the cuboid frame 11; and the optical imaging structure further comprises:

an inner rectangular frame 6, wherein the peripheral outer side of the inner rectangular frame 6 is fixed at the lower part of the peripheral inner side of the cuboid frame 11;

four groups of auxiliary mechanisms 7, wherein the four groups of auxiliary mechanisms 7 are arranged at the lower part of the peripheral sides of the cuboid frame 11 respectively, and the auxiliary mechanisms 7 further comprise:

two groups of first auxiliary connecting rods 71 perpendicular to the corresponding side edge of the cuboid frame 11, wherein the first auxiliary connecting rods 71 slidably penetrate through the corresponding side edge of the cuboid frame 11;

first connecting plates 72, wherein the first connecting plates 72 are parallel to the corresponding side edge of the cuboid frame 11, and the first connecting plates 72 are fixedly connected with one end of the first auxiliary connecting rods 71 located at the inner side of the cuboid frame 11;

second connecting plates 73, wherein the second connecting plates 73 are fixedly connected with one end of the first auxiliary connecting rods 71 located at the outer side of the cuboid frame 11, the outer sides of the first auxiliary connecting rods 71 are sleeved with a first spring 74, and both ends of the first spring 74 are respectively fixedly connected with the second connecting plates 73 and the outer side of corresponding side edge of the cuboid frame 11;

second auxiliary connecting rods 75, wherein one end of the second auxiliary connecting rods 75 is fixedly connected to one side of the second connecting plates 73 away from the first connecting plates 72;

limiting balls 76, wherein the limiting balls 76 are connected to the other ends of the second auxiliary connecting rods 75;

first connecting blocks 77, wherein the first connecting blocks 77 are fixedly connected to the outer side of the corresponding side edge of the cuboid frame 11;

telescopic rods 78, wherein the telescopic rods 78 are parallel to the corresponding side edge of the cuboid frame 11, and the fixed ends of the telescopic rods 78 are fixedly connected with the first connecting blocks 77;

second connecting blocks 79, wherein the second connecting blocks 79 are fixedly connected to the telescopic ends of the telescopic rods 78, one side of the second connecting blocks 79 close to the corresponding side edge of the cuboid frame 11 is provided with a connecting bevel 710, and the connecting bevel 710 is in contact with the limiting balls 76.

In the embodiment, the telescopic rods 78 may be electric telescopic rods or manual telescopic rods.

Preferably, one side of the first connecting plates 72 in contact with the mirror 12 is provided with elastic connecting blocks.

The working principle and beneficial effects of the above technical solution are as follows:

1. When the mirror 12 is installed, firstly, the lower end of the mirror 12 is installed to the upper end of the inner rectangular frame 6. At this time, the corresponding first connecting plate 72 is located on the outer side of the corresponding side edge of the mirror 12, and then the corresponding telescopic rod 78 is controlled to shrink, to drive the corresponding second connecting block 79 to move close to the corresponding first connecting block 77. The connecting bevel 710 on the second connecting block 79 is matched with the limiting ball 76, to drive the limiting ball 76 and the second auxiliary connecting rod 75 connected with the limiting ball 76 to move close to the corresponding side edge of the mirror 12. The second auxiliary connecting rod 75 drives the second connecting plate 73, the first auxiliary connecting rod 71 and the first connecting plate 72 to move close to the corresponding side edge of the mirror 12. The corresponding side edge of the mirror 12 is clamped through the first connecting plate 72, and finally the peripheral sides of the mirror 12 are clamped through the first connecting plates 72 of the four auxiliary mechanisms 7, so that the mirror 12 is reliably limited. The contraction length of the telescopic rods 78 can be controlled in the embodiment to adapt to mirrors 12 of different lengths or widths.

2. In the technical solution, the telescopic rod 78 used to control clamping is located at the outer side of the cuboid frame 11, which has the advantages that the internal space of the cuboid frame 11 is not occupied and control is more convenient. Moreover, the telescopic rod 78 is arranged parallel to the side edge of the cuboid frame 11 instead of perpendicular to the side edge of the cuboid frame 11, so as to prevent the telescopic rod 78 from being too long and the cuboid frame 11 from not being too thick, which will affect the installation of the telescopic rod 78.

Embodiment 3: based on embodiment 2, as shown in FIGS. 4-6, the auxiliary mechanisms 7 further comprise:

third auxiliary connecting rods 711, wherein one end of the third auxiliary connecting rods 711 is fixedly connected with one side of the second connecting plates 73 close to the corresponding first connecting plates 72;

ventilation filter plates 712, wherein the ventilation filter plates 712 are fixedly connected with the other ends of the third auxiliary connecting rods 711, and the corresponding side edge of the cuboid frame 11 is provided with a communicating hole 111 through which the ventilation filter plates 712 slide.

Optionally, the middle part of the ventilation filter plate 712 is also provided with a micro cooling fan 713.

In the embodiment, the cuboid frame 11 can be dusted before the installation of the optical glass 13 and the mirror 12 to prevent the dust in the cuboid frame 11 from affecting the subsequent work of the optical imaging structure.

The working principle and beneficial effects of the above technical solution are as follows:

1. In an initial state, the ventilation filter plate 712 and the micro cooling fan 713 are located outside the cuboid frame 11, which is convenient for replacing and repairing the ventilation filter plate 712 and the micro cooling fan 713 outside the cuboid frame 11.

2. In the above solution, when the telescopic rod 78 is used for controlling the second auxiliary connecting rod 75 to drive the second connecting plate 73, the first auxiliary connecting rod 71 and the first connecting plate 72 to move close to the corresponding side edge of the mirror 12, the second connecting plate 73 also drives the ventilation filter plate 712 and the micro cooling fan 713 to enter the communicating hole 111. After the mirror 12 and the optical glass 13 are finally installed on the cuboid frame 11, a relatively sealed accommodating space is formed inside the cuboid frame 11 and the light-emitting elements 14 in the accommodating space need heat dissipation after operation for a long time. Therefore, the micro cooling fan 713 can be controlled to work to dissipate the heat in the accommodating space, and the ventilation filter plate 712 is arranged to prevent external dust from entering the accommodating space and affecting the subsequent work of the optical imaging structure.

Figure 7:
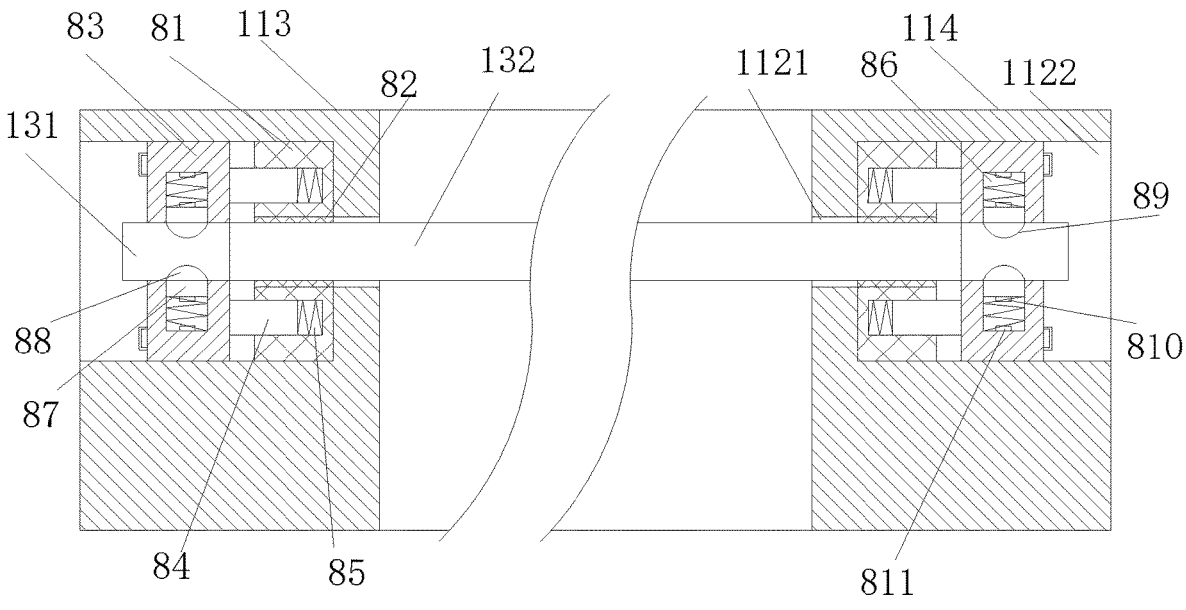
FIG. 7 is a main sectional view after the cuboid frame is connected with the optical glass in an embodiment of the present invention.
Figure 8:
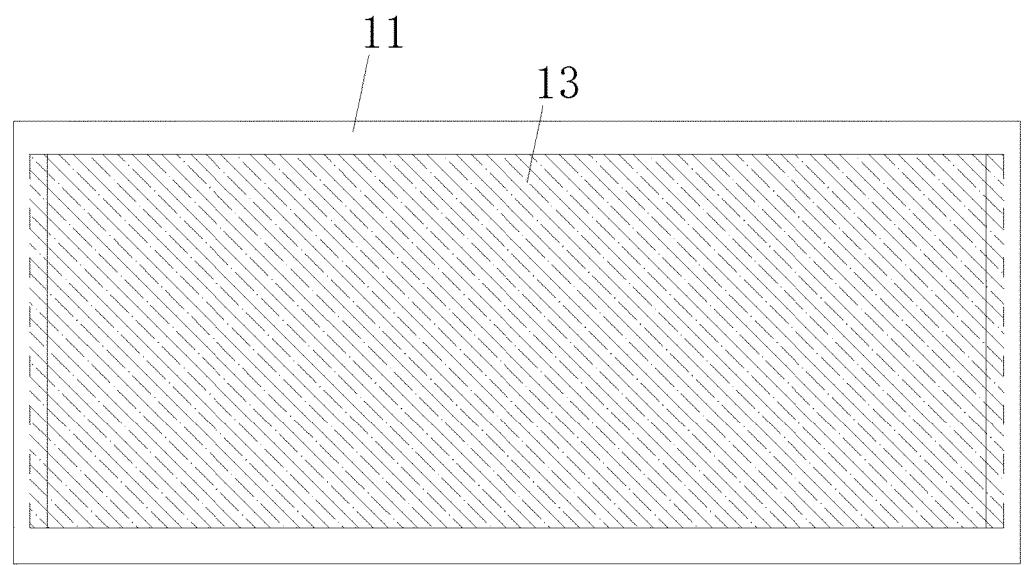
FIG. 8 is a local top view after the cuboid frame is connected with the optical glass in an embodiment of the present invention.
Figure 9:
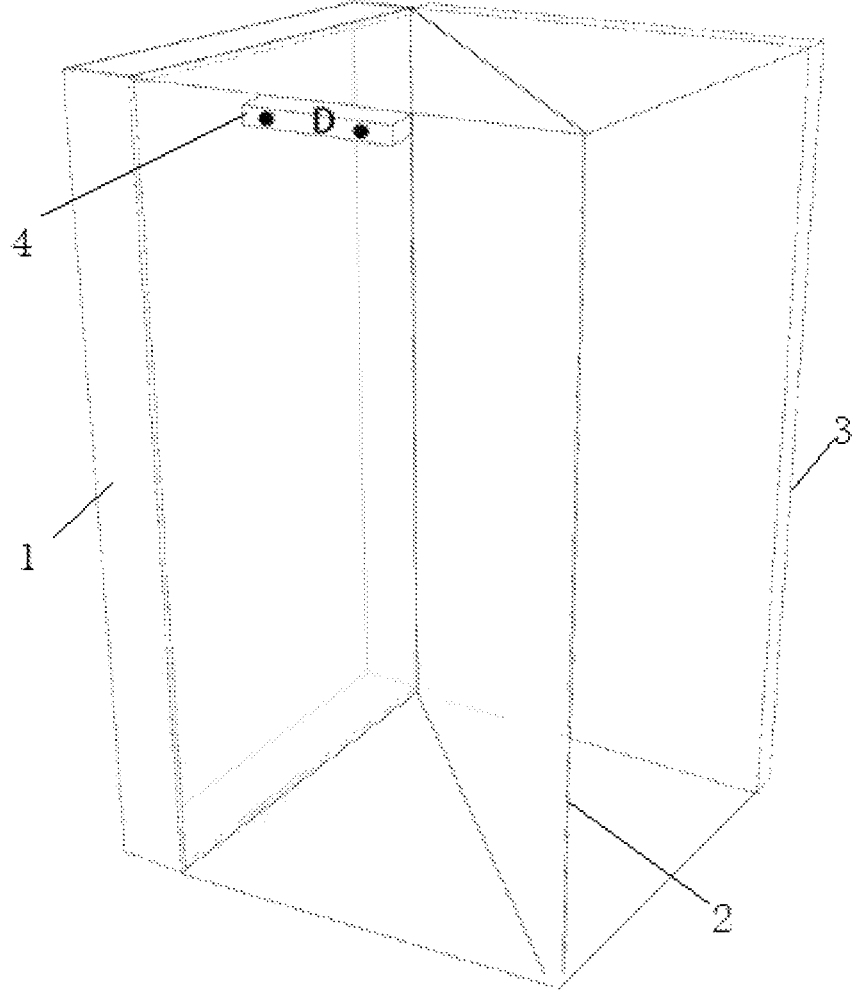
FIG. 9 is an overall structural schematic diagram of an existing holographic imaging system.
Figure 10:
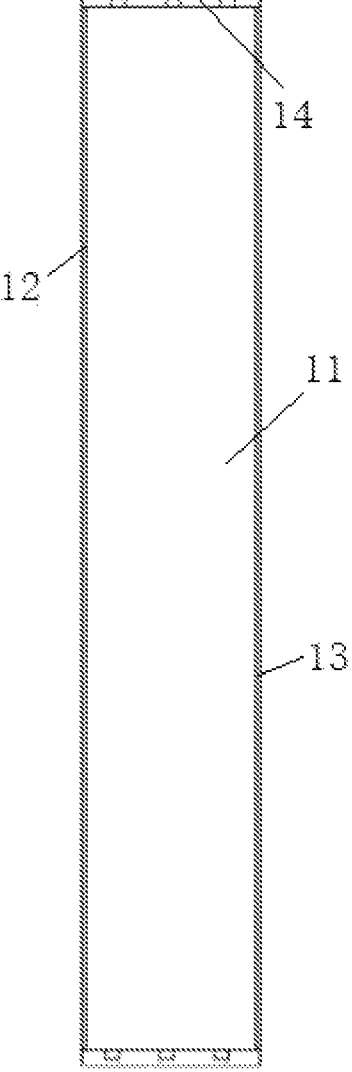
FIG. 10 is a structural schematic diagram of a reflection structure in an existing holographic imaging system.

Embodiment 4: based on any one of embodiments 1-3, as shown in FIGS. 4, 7 and 8, the upper part of the left side 113 of the cuboid frame and the upper part of the right side 114 of the cuboid frame are provided with opposite horizontal through hole structures 112; the left part of the optical glass 13 is connected in the horizontal through hole structure 112 at the left side 113 of the cuboid frame; the right part of the optical glass 13 is connected in the horizontal through hole structure 112 at the right side 114 of the cuboid frame; a part of the horizontal through hole structure 112 close to the inner side of the cuboid frame 11 is a first horizontal through hole 1121; a part of the horizontal through hole structure 112 close to the outer side of the cuboid frame 11 is a second horizontal through hole 1122; the first horizontal through hole 1121 is communicated with the second horizontal through hole 1122; and the height of the first horizontal through hole 1121 is less than the height of the second horizontal through hole 1122;

The optical glass 13 comprises: a glass body 132, wherein the left side and the right side of the glass body 132 are fixedly provided with first fixed blocks 131 respectively;

two groups of upper and lower symmetric limiting structures 8 are arranged in each horizontal through hole structure 112, and the limiting structures 8 comprise:

second fixed blocks 81, wherein the second fixed blocks 81 are fixedly connected to the inner wall of the second horizontal through hole 1122, and one side of the second fixed blocks 81 close to the optical glass 13 is provided with an elastic block 82;

slide blocks 83, wherein the slide blocks 83 are slidably connected with the inner wall of the second horizontal through hole 1122, and second chutes 86 are arranged on the close sides of the opposite upper and lower slide blocks 83;

slide rods 84, wherein the slide rods 84 are fixedly connected to one side of the slide blocks 83 close to the second fixed blocks 81, and the slide rods 84 are slidably connected into first chutes 85 in the second fixed blocks 81 along the left-right direction;

second springs, wherein both ends of the second springs are fixedly connected with the inner walls of the first chutes 85 and the slide rods 84 respectively;

limiting blocks 87, wherein the limiting blocks 87 are slidably connected in the second chutes 86 along the up-down direction, the close sides of the opposite upper and lower limiting blocks 87 are provided with arc limiting parts 88, and the arc limiting parts 88 are inserted into arc limiting grooves 89 at the upper or lower ends of the first fixed blocks 131;

third springs, wherein both ends of the third springs are fixedly connected with the limiting blocks 87 and the inner walls of the second chutes 86 respectively;

permanent magnets 810, wherein the permanent magnets 810 are arranged on one side of the limiting blocks 87 away from the arc limiting parts 88, and the inner walls of the second chutes 86 are provided with electromagnets 811 opposite to the permanent magnets 810.

In the present application, the mirror 12 may also be installed using the structure of the embodiment or installed by the above embodiment 3, wherein the upper and lower ends of the glass body 132 are flush with the upper and lower ends of the first fixed blocks 131;

In the embodiment, the sizes and shapes of the arc limiting parts 88 and the arc limiting grooves 89 are matched.

In the embodiment, a handle can be arranged on the outer side of the slide blocks 83 to facilitate the pulling of the slide blocks 83.

The working principle and beneficial effects of the above technical solution are as follows:

1. When the optical glass 13 is installed, firstly, the electromagnet 811 is controlled to work, so that the electromagnet 811 and the corresponding permanent magnet 810 directly attract each other to make the opposite upper and lower arc limiting parts 88 contract into the second chute 86. At this time, the corresponding third spring is compressed. Then, the optical glass 13 is inserted from the horizontal through hole structure 112 on the left side or the right side of the cuboid frame 11. After insertion, the corresponding electromagnet 811 is controlled to be powered off so that the opposite upper and lower arc limiting parts 88 are reset under the elastic force of the third spring. Thus, the arc limiting parts 88 are pressed tightly in the corresponding arc limiting grooves 89 to limit the optical glass 13. The optical glass 13 can be limited in the thickness direction through the opposite upper and lower arc limiting parts 88. The sizes and the shapes of the arc limiting parts 88 and the arc limiting grooves 89 are matched through the arc limiting parts 88 which are arranged in left and right, so as to further horizontally limit the optical glass 13.

2. In the embodiment, the first fixed blocks 131 are arranged on the left side and the right side of the glass body 132, and the first fixed blocks 131 are pressed through the arc limiting parts 88 instead of directly pressing the glass body 132, so as to avoid damaging the glass body 132. In the embodiment, the elastic blocks 82 are in direct contact with the upper and lower ends of the glass body 132 to avoid damaging the glass body 132.

3. In the embodiment, the slide blocks 83 can also be pulled so that the distance between the slide blocks 83 and the corresponding second fixed blocks 81 is changed. Thus, the first fixed blocks 131 at different positions in the left-right direction can be pressed, so as to adapt to the installation of the optical glass 13 with different sizes in the left-right direction.

4. In addition, the height of the first horizontal through hole 1121 is less than the height of the second horizontal through hole 1122, which can be convenient to manually adjust the positions of the second fixed blocks 81 in the second horizontal through hole 1122 with a larger space.

Embodiment 5: on the basis of any one of embodiment 1-4:

The peripheral inner side of the cuboid frame 11 is divided into a plurality of light-emitting regions; each light-emitting region is provided with a light-emitting element 14; each light-emitting region is provided with a first detection module; the first detection module is used for detecting first environmental parameters in the corresponding light-emitting region; and the first environmental parameters comprise: environmental brightness and environmental temperature.

The optical imaging structure further comprises:

a timing module for timing the working time of the light-emitting elements 14 in the light-emitting regions;

a power acquisition module for collecting the working power of the light-emitting elements 14;

a storage module for storing the detection results of the first detection modules, the timing module and the power acquisition module;

a control module, and an alarm module. The control module is electrically connected with the first detection modules, the timing module, the power acquisition module, the storage module and the alarm module respectively, and the control module controls the alarm module to work based on the first detection modules, the timing module, the power acquisition module and the storage module, comprising:

Based on the detection results of the timing module, the current first environmental parameters and the historical first environmental parameters stored in the storage module, the state coefficients of the light-emitting regions are calculated.

$$P_i = \left[ \partial_{1i} \left| \frac{K_{1i} - K_{0i}}{K_{0i}} \right| + \partial_{2i} \left| \frac{T_{1i} - T_{0i}}{T_{0i}} \right| \right] * \ln\left[ 1 + \frac{t_{0i}}{t_i} * \frac{T_i}{T_{i0}} \right]$$

$P_i$ is the state coefficient of the $i^{th}$ light-emitting region; $K_{1i}$ is the current environmental brightness value (obtained based on the first detection modules) of the $i^{th}$ light-emitting region; $K_{0i}$ is the historical brightness average value of the light-emitting element 14 in the $i^{th}$ light-emitting region under the current working power; $\partial_{1i}$ is the influence coefficient (with a value greater than 0 and less than 1) of the environmental brightness in the $i^{th}$ light-emitting region on the working reliability of the optical imaging structure; $\partial_2$, is the influence coefficient (with a value greater than 0 and less than 1) of the environmental temperature in the $i^{th}$ light-emitting region on the working reliability of the optical imaging structure; $T_{1i}$ is the current environmental temperature (obtained based on the first detection modules) of the $i^{th}$ light-emitting region; $T_{0i}$ is the historical environmental temperature average value of the $i^{th}$ light-emitting element 14 under the current working power; $t_{0i}$ is the preset single working time of the light-emitting element 14 in the $i^{th}$ light-emitting region; $t_i$ is the completed work time of the current work of the light-emitting element 14 in the $i^{th}$ light-emitting region; $T_i$ is the accumulated working time of the light-emitting element 14 in the $i^{th}$ light-emitting region; $T_{i0}$ is the rated total working time of the light-emitting element 14 in the $i^{th}$ light-emitting region; and $l_n$ is a natural logarithm.

When the state coefficients of the light-emitting regions are not within the corresponding preset range, the corresponding light-emitting regions are determined to be abnormal light-emitting regions, and the control module controls the alarm module to issue a prompt to prompt that the corresponding light-emitting regions are the abnormal light-emitting regions.

The beneficial effects of the above technical solution are as follows: the peripheral inner side of the cuboid frame 11 is divided into a plurality of light-emitting regions; the environmental brightness and the environmental temperature in the corresponding light-emitting regions are detected; the working time of the light-emitting elements 14 in the light-emitting regions is timed; the working power of the light-emitting elements 14 is collected; and then the state coefficients of the light-emitting regions are calculated based on the detection results of the timing module, the current first environmental parameters and the historical first environmental parameters stored in the storage module. In the specific calculation formula, the following parts are considered simultaneously: comparison between the current environmental brightness and the historical brightness average value of the light-emitting elements 14 under the current working power, comparison between the current environmental temperature and the historical environmental temperature average value of the light-emitting elements 14 under the current working power, the influence coefficient of the light-emitting brightness on the working reliability of the optical imaging structure, the influence coefficient of environmental temperature in the light-emitting region on the working reliability of the optical imaging structure, comparison between the completed working time of the current work of the light-emitting element 14 and the preset single working time (if the single working time is longer, relatively speaking, the temperature is higher, but if the working time is too short and the temperature is too high, this indicates that the light-emitting element 14 is abnormal), and comparison between the accumulated working time of the light-emitting element 14 and the rated total working time of the light-emitting element 14 (the ratio of the accumulated working time of the light-emitting element 14 and the rated total working time of the light-emitting element 14 is too large. At this time, the working life factor of the light-emitting element 14 is considered, and the light-emitting element 14 can be replaced as needed). The state coefficients of the light-emitting regions are comprehensively determined. When the state coefficients of the light-emitting regions are not within the corresponding preset range, the corresponding light-emitting regions are determined to be the abnormal light-emitting regions, and the control module controls the alarm module to issue a prompt to prompt that the corresponding light-emitting regions are the abnormal light-emitting regions. According to the actual situation, the light-emitting elements 14 in the corresponding light-emitting regions are repaired or replaced, so as to ensure the working reliability of the entire optical imaging structure.

Obviously, those skilled in the art can implement various modifications and variations for the present invention without departing from the spirit and scope of the present invention. So, the present invention is intended to include the modifications and variations if the amendments and variations of the present invention belong to claims of the present invention and the equivalent technical scope.

I claim:

1. An optical imaging structure, comprising: a reflection structure, a holographic medium, a first display screen and a second display screen, wherein a first angle is arranged between the reflection structure and the first display screen;

the second display screen is located directly above the reflection structure, the second display screen is parallel to the reflection structure, and a distance between the second display screen and the reflection structure is greater than the width of the first display screen;

the holographic medium is arranged at an inner side of a structure formed by the reflection structure, the first display screen and the second display screen, and a second angle is arranged between the holographic medium and the first display screen;

wherein the reflection structure comprises a cuboid frame, a mirror and optical glass; light-emitting elements are installed in a circle at the peripheral inner side of the cuboid frame; the mirror is arranged at the lower part of the cuboid frame; and the optical glass is arranged at the upper part of the cuboid frame.

2. The optical imaging structure according to claim 1, wherein the first angle is 90°, the second angle is 45°, and the angle between the holographic medium and the second display screen and the angle between the holographic medium and the reflection structure are both 45°.

3. The optical imaging structure according to claim 1, wherein the length of the holographic medium, the length of the reflection structure, the length of the first display screen and the length of the second display screen are the same; the width of the reflection structure, the width of the first display screen and the width of the second display screen are the same; and the width of the holographic medium is $\sqrt{2}$ times the width of the reflection structure.

4. The optical imaging structure according to claim 1, wherein the optical glass has the optical property of unidirectional light transmission.

5. The optical imaging structure according to claim 1, wherein the mirror is parallel to the corresponding side edge of the cuboid frame; and the optical imaging structure further comprises:

an inner rectangular frame, wherein the peripheral outer side of the inner rectangular frame is fixed at the lower part of the peripheral inner side of the cuboid frame;

four groups of auxiliary mechanisms, wherein the four groups of auxiliary mechanisms are arranged at the lower part of the peripheral sides of the cuboid frame respectively, and the auxiliary mechanisms further comprise:

two groups of first auxiliary connecting rods perpendicular to the corresponding side edge of the cuboid frame, wherein the first auxiliary connecting rods slidably penetrate through the corresponding side edge of the cuboid frame;

first connecting plates, wherein the first connecting plates are parallel to the corresponding side edge of the cuboid frame, and the first connecting plates are fixedly connected with one end of the first auxiliary connecting rods located at the inner side of the cuboid frame;

second connecting plates, wherein the second connecting plates are fixedly connected with one end of the first auxiliary connecting rods located at the outer side of the cuboid frame, the outer sides of the first auxiliary connecting rods are sleeved with a first spring, and both ends of the first spring are respectively fixedly connected with the second connecting plates and the outer side of corresponding side edge of the cuboid frame;

second auxiliary connecting rods, wherein one end of the second auxiliary connecting rods is fixedly connected to one side of the second connecting plates away from the first connecting plates;

limiting balls, wherein the limiting balls are connected to the other ends of the second auxiliary connecting rods;

first connecting blocks, wherein the first connecting blocks are fixedly connected to the outer side of the corresponding side edge of the cuboid frame;

telescopic rods, wherein the telescopic rods are parallel to the corresponding side edge of the cuboid frame, and the fixed ends of the telescopic rods are fixedly connected with the first connecting blocks;

second connecting blocks, wherein the second connecting blocks are fixedly connected to the telescopic ends of the telescopic rods, one side of the second connecting blocks close to the corresponding side edge of the cuboid frame (11) is provided with a connecting bevel (710), and the connecting bevel is in contact with the limiting balls.

6. The optical imaging structure according to claim 5, wherein the auxiliary mechanisms further comprise:

third auxiliary connecting rods, wherein one end of the third auxiliary connecting rods is fixedly connected with one side of the second connecting plates close to the corresponding first connecting plates;

ventilation filter plates, wherein the ventilation filter plates are fixedly connected with the other ends of the third auxiliary connecting rods, and the corresponding side edge of the cuboid frame is provided with a communicating hole through which the ventilation filter plates slide.

7. The optical imaging structure according to claim 6, wherein the middle part of the ventilation filter plate is also provided with a micro cooling fan.

8. The optical imaging structure according to claim 1, wherein the upper part of the left side of the cuboid frame and the upper part of the right side of the cuboid frame are provided with opposite horizontal through hole structures; the left part of the optical glass is connected in the horizontal through hole structure at the left side of the cuboid frame; the right part of the optical glass is connected in the horizontal through hole structure at the right side of the cuboid frame; a part of the horizontal through hole structure close to the inner side of the cuboid frame is a first horizontal through hole; a part of the horizontal through hole structure close to the outer side of the cuboid frame is a second horizontal through hole; the first horizontal through hole is communicated with the second horizontal through hole; and the height of the first horizontal through hole is less than the height of the second horizontal through hole;

the optical glass comprises: a glass body, wherein the left side and the right side of the glass body are fixedly provided with first fixed blocks respectively;

two groups of upper and lower symmetric limiting structures are arranged in each horizontal through hole structure, and the limiting structures comprise:

second fixed blocks, wherein the second fixed blocks are fixedly connected to the inner wall of the second horizontal through hole, and one side of the second fixed blocks close to the optical glass is provided with an elastic block;

slide blocks, wherein the slide blocks are slidably connected with the inner wall of the second horizontal through hole, and second chutes are arranged on the close sides of the opposite upper and lower slide blocks;

slide rods, wherein the slide rods are fixedly connected to one side of the slide blocks close to the second fixed blocks, and the slide rods are slidably connected into first chutes in the second fixed blocks along the left-right direction;

second springs, wherein both ends of the second springs are fixedly connected with the inner walls of the first chutes and the slide rods respectively;

limiting blocks, wherein the limiting blocks (87) are slidably connected in the second chutes (86) along the up-down direction, the close sides of the opposite upper and lower limiting blocks are provided with arc limiting parts, and the arc limiting parts are inserted into arc limiting grooves (89) at the upper or lower ends of the first fixed blocks;

third springs, wherein both ends of the third springs are fixedly connected with the limiting blocks and the inner walls of the second chutes (86) respectively;

permanent magnets, wherein the permanent magnets are arranged on one side of the limiting blocks away from the arc limiting parts, and the inner walls of the second chutes are provided with electromagnets opposite to the permanent magnets.

* * * * *